(12) United States Patent
Kapaan et al.

(10) Patent No.: US 7,052,427 B2
(45) Date of Patent: May 30, 2006

(54) ELECTRIC SCREW ACTUATOR SYSTEM

(75) Inventors: Hendrikus Jan Kapaan, Nieuwegein (NL); Eduardus Gerardus Maria Holweg, Delft (NL); Aurelio Nervo, Turin (IT)

(73) Assignee: SKF Engineering & Research Centre, BV, Nieuwegein (NL)

( * ) Notice: Subject to any disclaimer, the term of this patent is extended or adjusted under 35 U.S.C. 154(b) by 74 days.

(21) Appl. No.: 10/257,152

(22) PCT Filed: Apr. 11, 2001

(86) PCT No.: PCT/NL01/00289

§ 371 (c)(1),
(2), (4) Date: Dec. 2, 2002

(87) PCT Pub. No.: WO01/77545

PCT Pub. Date: Oct. 18, 2001

(65) Prior Publication Data

US 2003/0139243 A1 Jul. 24, 2003

(30) Foreign Application Priority Data

Apr. 11, 2000 (NL) .................................. 1014911

(51) Int. Cl.
*F16H 3/72* (2006.01)
(52) U.S. Cl. .............................. 475/4; 475/3; 188/158
(58) Field of Classification Search .................. 475/1, 475/3, 4; 188/71.9, 156, 158, 162
See application file for complete search history.

(56) References Cited

U.S. PATENT DOCUMENTS

| 828,945 | A | * | 8/1906 | Maclean | 475/4 X |
| 2,300,576 | A | * | 11/1942 | Klein | 475/4 X |
| 2,370,976 | A | * | 3/1945 | Lear | 475/4 |
| 2,405,338 | A | * | 8/1946 | Werner | 475/4 |
| 2,481,477 | A | * | 9/1949 | Peery | 475/4 X |
| 2,621,544 | A | * | 12/1952 | Rossmann | 475/4 |
| 3,038,252 | A | | 6/1962 | Turek | |
| 3,038,352 | A | * | 6/1962 | Murphy | 475/4 X |
| 3,363,480 | A | * | 1/1968 | Murphy | 475/4 |
| 4,415,054 | A | | 11/1983 | Drutchas | |
| 4,760,989 | A | * | 8/1988 | Elliott et al. | 475/4 X |
| 4,896,562 | A | | 1/1990 | Wilkinson et al. | |
| 4,994,001 | A | * | 2/1991 | Wilkinson et al. | 475/4 |
| 5,002,032 | A | | 3/1991 | Kolberg | |
| 5,086,861 | A | * | 2/1992 | Peterson | 180/445 |

FOREIGN PATENT DOCUMENTS

DE 42 18 717 A1 12/1993
JP 403096749 * 4/1991 ................. 475/4

* cited by examiner

*Primary Examiner*—Ha Ho
(74) *Attorney, Agent, or Firm*—Oliff & Berridge, PLC

(57) ABSTRACT

An electric screw actuator system, e.g. for an electrically driven and controlled steering device, comprises a screw actuator, an electric motor (2) engaging the screw actuator through a reduction gear mechanism (3), electronic operating means for operating the screw actuator electrically, and a mechanical back-up system for operating the screw actuator in the absence of electric power e.g. in the case of an electric power failure of in the case the electric power is switched off, maintenance, garage parking etc. The mechanical back-up system comprises a manually controllable operation member (4) and an electromagnetic coupling (6), said coupling disengaging the rotation member from the screw actuator in the case of nominal operation and availability of electric power, and engaging the rotation member with the screw actuator in the case of electric power failure.

8 Claims, 4 Drawing Sheets

# ELECTRIC SCREW ACTUATOR SYSTEM

BACKGROUND OF THE INVENTION

1. Field of Invention

The invention is related to the field of electric screw actuator systems which are to be applied as the main drive for all kinds of tasks, such as the electric drive and control of the steering device of a vehicle, the brake device thereof etc.

2. Description of Related Art

A major point of concern in the field of electric screw actuator systems is the degree of reliability of the electric components thereof, including the supply of electric current which is necessary for powering the system.

Although the reliability has meanwhile been raised to a level which is accepted in most fields of technology, e.g. the aircraft industry, and the automotive industry, nevertheless several reasons still exist to apply a mechanical back-up system. Such mechanical back-up system might not always be necessary for reasons of lack of reliability, but other reasons, such as a feeling of confidence by the car driver, (long term) garage parking etc. may make it desirable to incorporate a mechanical back-up.

SUMMARY OF THE INVENTION

The invention aims at providing such electric screw actuator system, e.g. for an electrically driven and controlled steering device. Said system comprises a screw actuator, an electric motor engaging the screw actuator through a reduction gear mechanism, electronic operating means for operating the screw actuator electrically, and a mechanical back-up system for operating the screw actuator in the absence of electric power, e.g. in the case of an electric power failure or in the case the electric power is switched off, maintenance, garage parking etc., said mechanical back-up system comprising a manually controllable operation member and an electromagnetic coupling, said coupling disengaging the rotation member from the screw actuator in the case of nominal operation and availability of electric power, and engaging the rotation member with the screw actuator in the case of absence of electric power.

In the electric screw actuator system according to the invention, an automatic switch takes place from electric operation towards manual, full mechanic operation when, for whatever reason, no electric current is available. Under normal conditions however, full electric drive and control takes place, for instance through control buttons, a joystick etc.

Although the mechanical back-up is primarily intended to provide relief under emergency conditions, additional "normal" or desired functions can be attributed thereto as well. In the case of automotive applications for instance it may be desirable to apply additional mechanical actuation of the park brake for long term braking of the vehicle, such as uninterrupted parking for several weeks or months. In such case, the electric battery would gradually loose most of its energy when electric drive of the parking brake would be applied.

The electric motor is usually a relatively high revolution motor, which necessitates the application of the reduction gear mechanism. On the other hand, the manually controllable operation member, such as a steer, a stick etc., usually only provides a limited displacement or rotation. Thus, according to the invention, an auxiliary gear mechanism is provided for obtaining the necessary number of revolutions of the nut or screw so as to obtain the required displacement. Said auxiliary gear mechanism is an accelerating gear mechanism.

Preferably, the reduction gear mechanism and the auxiliary gear mechanism are integrated. In that case, the reduction gear mechanism comprises a sun gear wheel which is driveable by the electric motor, a fixed ring gear wheel connected to one of the nut and the screw, satellite gear wheels which engage the sun gear wheel and the ring gear wheel, and a carrier onto which the satellite gear wheels are rotatably mounted, said carrier engaging the other of the nut and the screw.

In a compact embodiment, the nut of the screw actuator is connected to a housing, said housing furthermore carrying the fixed ring gear wheel(s) which is (are) concentric with respect to the nut and the screw, as well as the electromagnetic coupling.

Furthermore, the axis of the coupling can be transverse with respect to the axis of the screw actuator, in which case the coupling engages the auxiliary gear mechanism through bevel gears.

The mechanical back-up system may comprise a flexible cable drive which at one end is connected to the coupling, and which at the other end is provided with a manually operated lever means, e.g. a steer, joystick or the like. An additional gear acceleration unit may also be located near the joystick.

The manually operated lever means has a swivel point which is fixed with respect to the screw actuator, the flexible cable drive being connected to the lever means at the swivel point thereof, electromagnetic immobilisation means being provided for preventing rotation of the lever means in the case of nominal operation and availability of electric power, and for allowing rotation of the lever means in the case of absence of electric power.

Preferably, the lever means carry the electronic operating means for electrically operating the screw actuator, like existing drive-by-wire systems. This electronic operating means may for instance be a joystick which is directly mounted to the swivel point, or at a distance therefrom at the free end of the lever means.

A sensor may be provided for monitoring and controlling a displacement and/or a rotation of e.g. the nut and/or the screw in closed loop configuration with the electric motor, the electronic operating means, and an electronic control unit.

As mentioned, the system according to the invention may be applied to steer a vehicle. Thus, the invention is also related to an electromechanical steering device, comprising an electric screw actuator system as described before and a joystick having at least one force sensor and/or at least one displacement or rotation sensor for steering, and/or braking, and or accelerating action.

BRIEF DESCRIPTION OF THE DRAWINGS

The invention will now be described further with reference to an electromechanical steering device according to the invention as shown in the drawings.

DETAILED DESCRIPTION OF PREFERRED EMBODIMENTS

Figure 1:
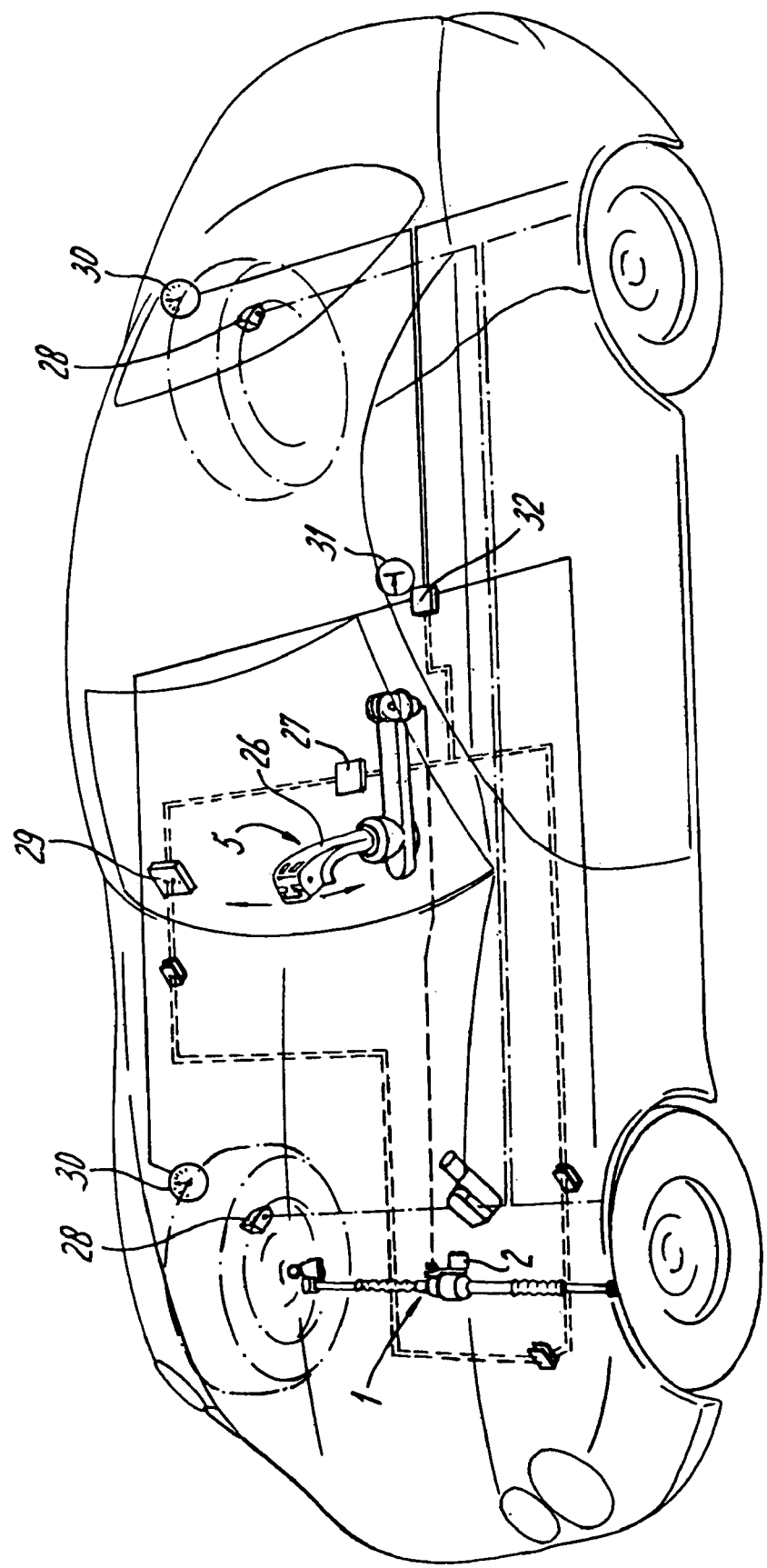
FIG. 1 shows the general layout of a vehicle provided with an electric steering and brake device according to the invention.

The vehicle shown in FIG. 1 comprises a steering actuator 1 which is connected to the front wheels of the vehicle, as well as a joystick 26 situated near the driver's seat. Furthermore, electromechanical brake actuators 28 are provided which control the disk brakes on all wheels of the vehicle, and which also may be controlled by the joystick 26. Electromechanical drum brakes may also form a part of a complete electromechanical brake system.

The joystick 26 is connected to an electronic control unit 27, which through the driving dynamic controller 29 controls the electric motor 2 of the screw actuator 1.

The joystick 26 also controls the electromechanical brake actuators 28 on the basis of signals received from the wheel speed sensors 30. Furthermore, sensors 31 have been incorporated which monitor the driving status, all sensors being connected to the sensor electronics control device 32.

Figure 2:
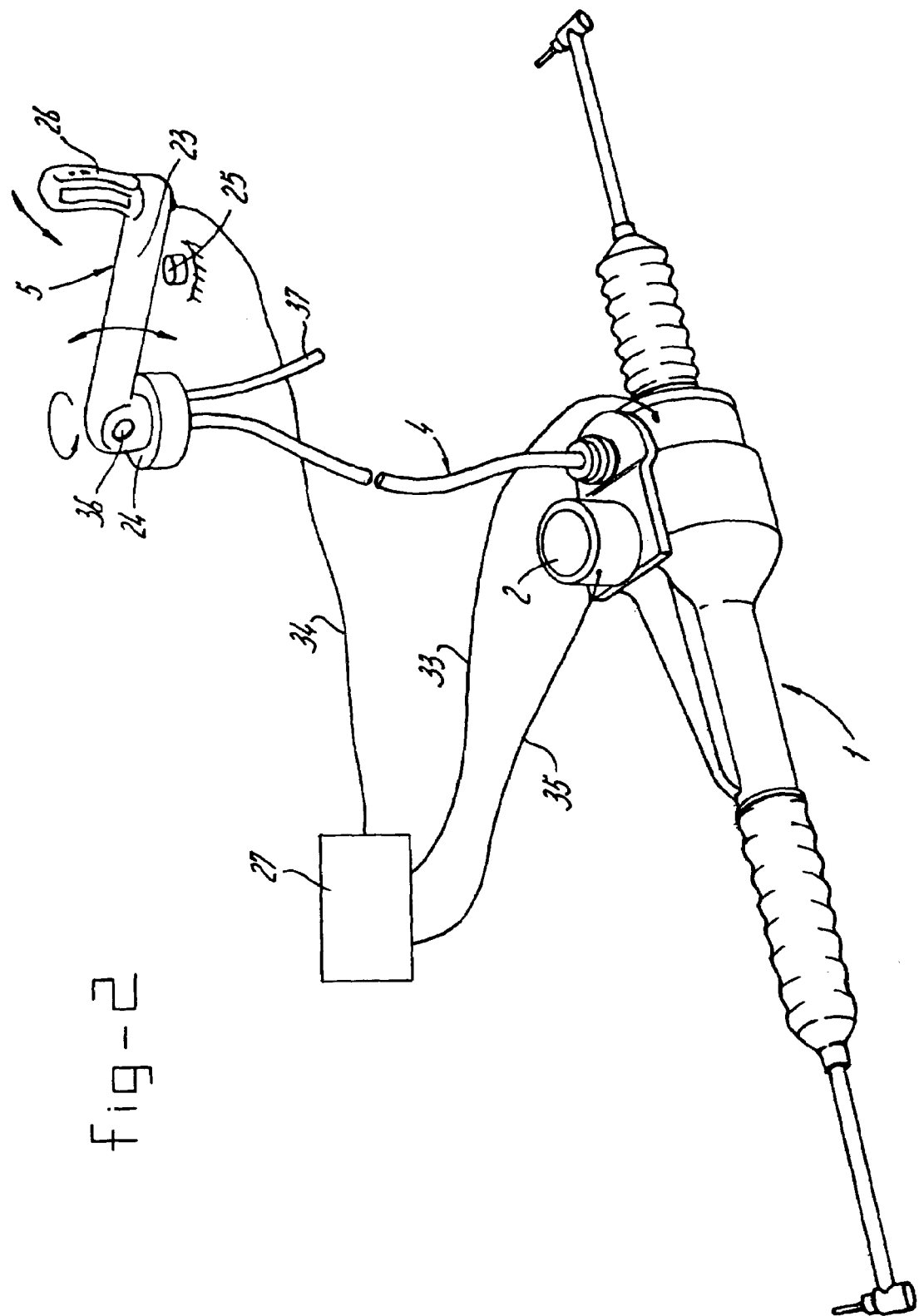
FIG. 2 shows the general layout of the electric steering device according to the invention.

As shown in FIG. 2, the control unit 27 receives signals related e.g. to the load exerted on the screw actuator 1, displacements and/or rotations of components thereof, through cable 33. Through cable 34, the control unit 27 receives signals from the joystick 26. On the basis of these signals, the electric motor 2 is controlled, through cable 35, for actuating the screw actuator 1.

The joystick 26 is mounted at the free end of the lever 23, which is rotatable around a vertical axis on the swivel point 24. Furthermore, the lever 23 can pivot about the horizontal pivot axis of the hinge 36.

By means of the immobilisation means 25, e.g. an electromagnetic coupling, the lever 23, and thereby the joystick 26 are held in a nominal position under nominal conditions, that is when electric current is available.

In the absence of electric current, e.g. when the electric current is switched off or in case of an electric power failure, the electromagnetic coupling 25 is released and by manipulating the lever 23 through the joystick 26, a rotation through swivel 24 is imparted on the flexible cable 4 which is capable to transmit a torque.

In turn, this flexible cable 4 drives the screw actuator 1 in such a way that steering action is still possible.

Additionally, a flexible brake cable 37 is provided, which, in the absence of an electric power, is controlled by pivoting the lever 23 about the hinge 36. The flexible cable 37 is connected to the brake actuators 28, but is not shown in further detail.

The actuator applied can be executed with a rotating nut and a moving screw, or a moving nut and a rotating screw.

Figure 3:
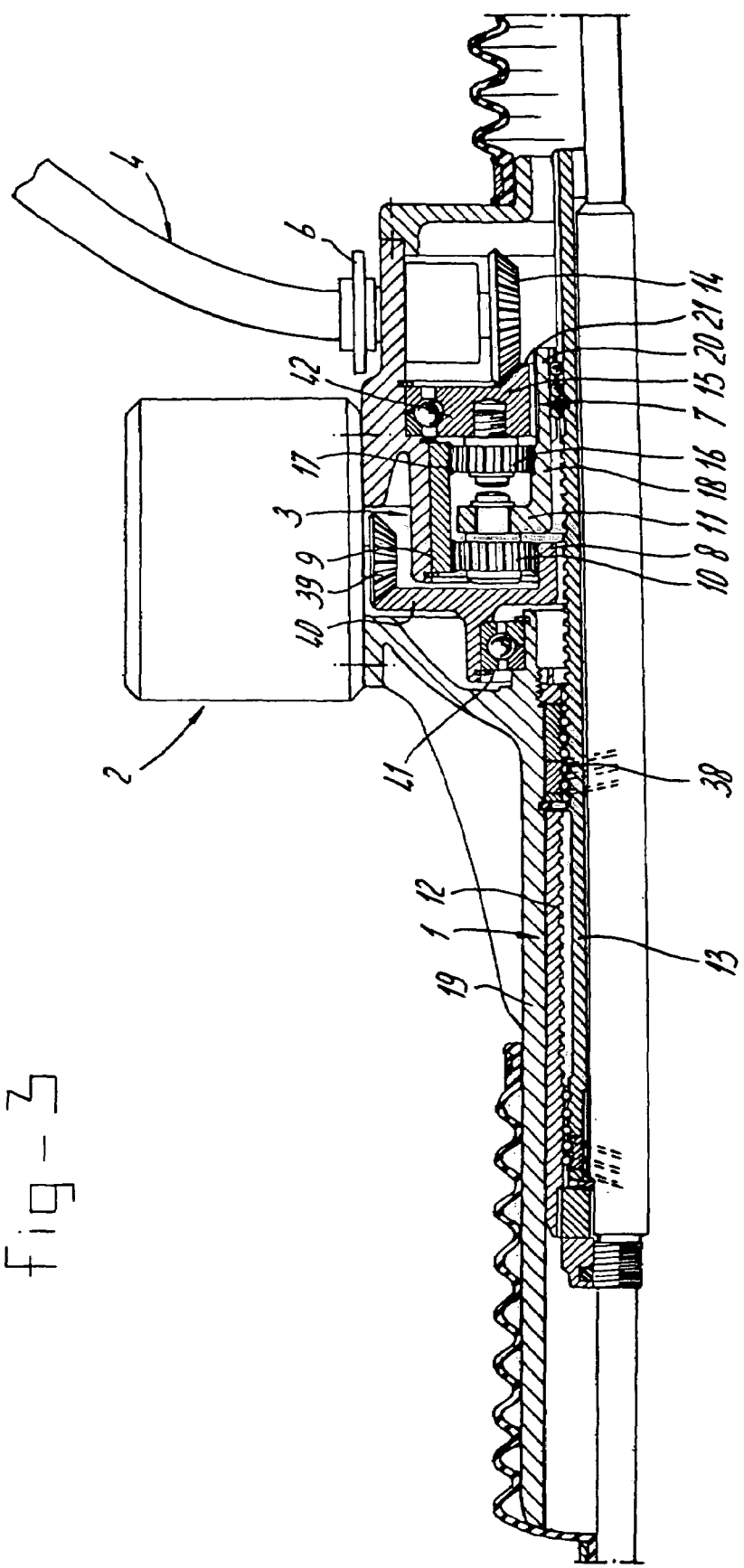
FIG. 3 shows a cross-section of a first exemplary embodiment of the screw actuator.
Figure 4:
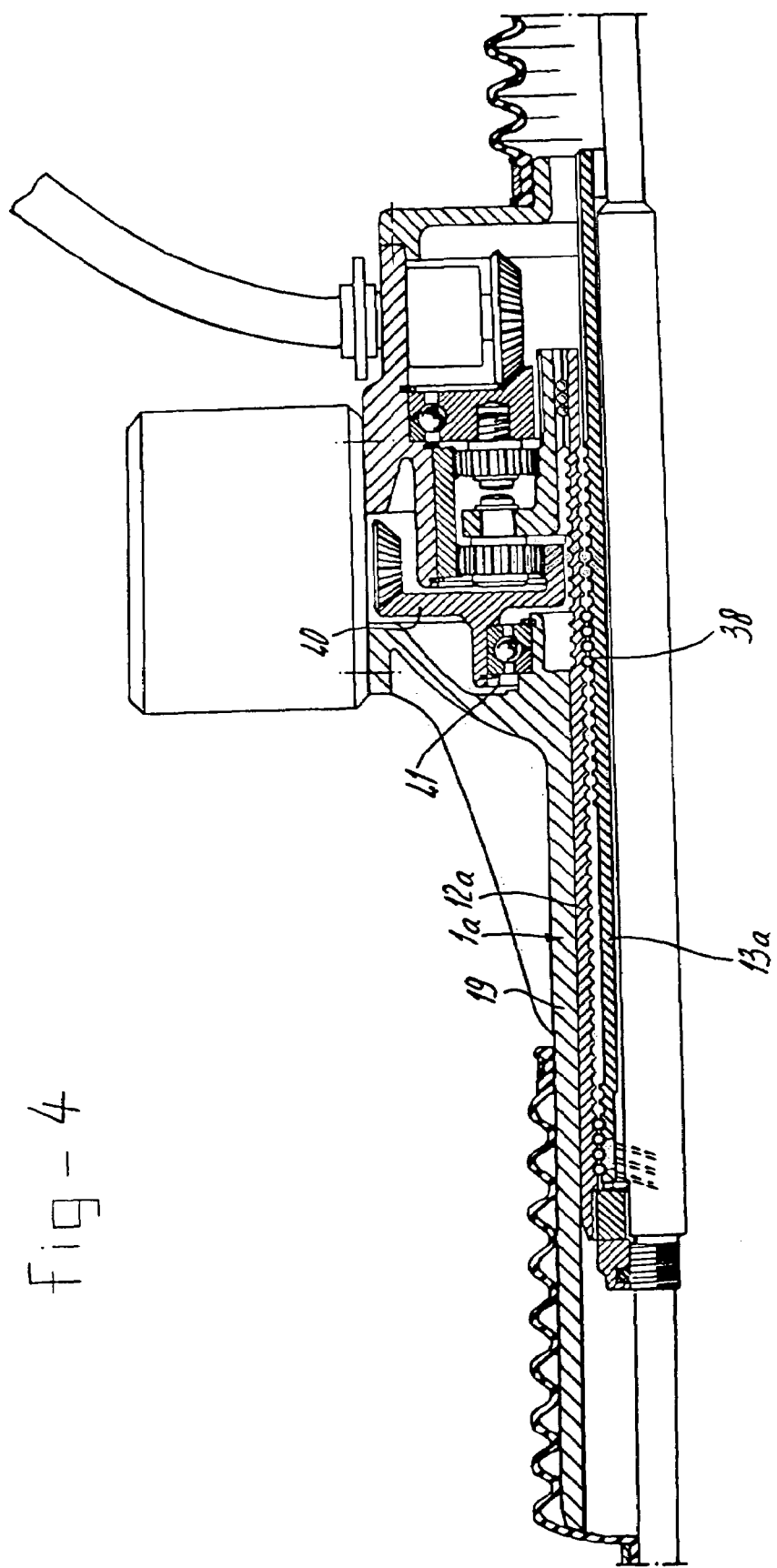
FIG. 4 shows a cross-section of a second exemplary embodiment of the screw actuator.

As shown in FIG. 3, the screw actuator 1 is accommodated in a housing 19, which is non-rotatably fixed with respect to e.g. the chassis of a vehicle. The nut 12 is immovably fixed within the housing 19. The screw 13 is rotatably and translatably supported within the nut 12 by means of the balls 38, which engage correspondingly shaped screw threads in the nut 12 and the screw 13. Alternatively, as noted in paragraph [0029] above and as shown in FIG. 4, the nut 12a may be rotatably supported within the housing 19 and the screw 13a may be non-rotatable and translatable. In such case, the rotatable motion described below is imparted to the nut 12a rather than to the screw 13.

The screw actuator 1 is actuated through an electric motor 2 which two bevel pinion 39 drives a first reduction bevel gear 40 which is positioned around the screw 13. The bevel gear 40 is rotatably supported by means of bearing 41. The bevel gear 40 is integrated with a sun gear wheel 8, which engages satellite gear wheels 10. The housing 19 carries a fixed ring gear wheel 9, which also engages the satellite gear wheels 10.

The satellite gear wheels 10 are rotatably mounted on a carrier 11, which through the spline/ball mechanism 20 is able to rotate the screw 13.

The bevel gears 39, 40, as well as the satellite gear wheel mechanism 8–11 provide the necessary reduction of the motor rotations for driving the screw actuator 1.

In case of an electric power interruption, the electric motor 2 is no longer able to drive the screw actuator 1. For this reason, a mechanical back-up system is provided, comprising a flexible cable 4, which is connected to electromagnetic coupling 6. In case of a power interruption 6, this electromagnetic coupling 6 connects the flexible cable 4 to the auxiliary drive (bevel) gear wheel 14. The auxiliary drive gear wheel 14 engages a bevel gear 21, which surrounds the screw 13. The bevel gear 21 is integrated with an auxiliary carrier 15, rotatably supported with respect to the housing by means of the bearing 42.

The carrier 15 carries auxiliary satellite gear wheels 16, which engage a fixed auxiliary ring gear wheel 17, as well as an auxiliary sun gear wheel 18 integrated with the carrier 11.

By rotating the flexible cable through the lever 23 (see FIG. 2) the screw 13 can thus be rotated mechanically.

The bevel gears 14, 21 or other appropriate gear transmission principles are preferably accelerating gear wheels.

The invention claimed is:

1. Electric screw actuator system usable in at least an electrically driven and controlled steering device, the system comprising:
   a screw actuator containing at least a nut and a screw;
   an electric motor engaging the screw actuator through a reduction gear mechanism;
   an electronic operating device for operating the screw actuator electrically; and
   a mechanical back-up system for operating the screw actuator in the absence of electric power due to at least one of an electric power failure and the electric power being intentionally switched off, the mechanical back-up system further comprises a manually controllable rotation member and an electromagnetic coupling, the coupling disengaging the rotation member from the screw actuator in the case of normal operation and availability of electric power, and engaging the rotation member with the screw actuator in the case of absence of electric power,
   wherein the coupling is connected to an auxiliary gear mechanism which engages the screw actuator in case of absence of electric power, the coupling is connected to an auxiliary drive gear wheel which engages the screw actuator, and the reduction gear mechanism and the auxiliary gear mechanism are integrated, and the reduction gear mechanism comprises a sun gear wheel which is driveable by the electric motor, a fixed ring gear wheel connected to one of the nut and the screw, satellite gear wheels which engage the sun gear wheel and the ring gear wheel and a carrier onto which the satellite gear wheels are rotatably mounted, the carrier engaging the other of the nut and the screw, and the auxiliary drive gear wheel engages an auxiliary carrier onto which auxiliary satellite gear wheels are rotatably mounted, said auxiliary satellite gear wheels engaging an auxiliary ring gear wheel which is fixed with respect to the fixed ring gear wheel, and an auxiliary sun gear wheel connected to the carrier.

2. Electric screw actuator system usable in at least an electrically driven and controlled steering device, the system comprising:

a screw actuator containing at least a nut and a screw;

an electric motor engaging the screw actuator through a reduction gear mechanism;

an electronic operating device for operating the screw actuator electrically; and a mechanical back-up system for operating the screw actuator in the absence of electric power due to at least one of an electric power failure and the electric power being intentionally switched off, the mechanical back-up system further comprises a manually controllable rotation member and an electromagnetic coupling, the coupling disengaging the rotation member from the screw actuator in the case of normal operation and availability of electric power, and engaging the rotation member with the screw actuator in the case of absence of electric power, wherein the coupling is connected to an auxiliary gear mechanism which engages the screw actuator in case of absence of electric power, and the reduction gear mechanism and the auxiliary gear mechanism are integrated, and the reduction gear mechanism comprises a sun gear wheel which is driveable by the electric motor, a fixed ring gear wheel connected to one of the nut and the screw, satellite gear wheels which engage the sun gear wheel and the ring gear wheel and a carrier onto which the satellite gear wheels are rotatably mounted, the carrier engaging the other of the nut and the screw, the nut is connected to a housing, the housing furthermore carrying the fixed ring gear wheel which is concentric with respect to the nut and the screw and the coupling, and the screw engages the carrier through a spline/ball mechanism.

3. Electric screw actuator system usable in at least an electrically driven and controlled steering device, the system comprising:

a screw actuator containing at least a nut and a screw;

an electric motor engaging the screw actuator through a reduction gear mechanism;

an electronic operating device for operating the screw actuator electrically; and a mechanical back-up system for operating the screw actuator in the absence of electric power due to at least one of an electric power failure and the electric power being intentionally switched off, the mechanical back-up system further comprises a manually controllable rotation member and an electromagnetic coupling, the coupling disengaging the rotation member from the screw actuator in the case of normal operation and availability of electric power, and engaging the rotation member with the screw actuator in the case of absence of electric power, wherein the coupling is connected to an auxiliary gear mechanism which engages the screw actuator in case of absence of electric power, and the reduction gear mechanism and the auxiliary gear mechanism are integrated, and the reduction gear mechanism comprises a sun gear wheel which is driveable by the electric motor, a fixed ring gear wheel connected to one of the nut and the screw, satellite gear wheels which engage the sun gear wheel and the ring gear wheel and a carrier onto which the satellite gear wheels are rotatably mounted, the carrier engaging the other of the nut and the screw, the nut is connected to a housing, the housing furthermore carrying the fixed ring gear wheel which is concentric with respect to the nut and the screw and the coupling, and the axis of the coupling is transverse with respect to the axis of the screw actuator and the coupling engages the auxiliary gear mechanism through bevel gears.

4. Electric screw actuator system usable in at least an electrically driven and controlled steering device, the system comprising:

a screw actuator containing at least a nut and a screw;

an electric motor engaging the screw actuator through a reduction gear mechanism;

an electronic operating device for operating the screw actuator electrically; and a mechanical back-up system for operating the screw actuator in the absence of electric power due to at least one of an electric power failure and the electric power being intentionally switched off, the mechanical back-up system further comprises a manually controllable rotation member and an electromagnetic coupling, the coupling disengaging the rotation member from the screw actuator in the case of normal operation and availability of electric power, and engaging the rotation member with the screw actuator in the case of absence of electric power, wherein the mechanical back-up system further comprises a flexible cable drive, capable of transmitting a torque, or a pulling cable or a mechanical linkage, which at one end is connected to the coupling, and which at the other end is provided with a manually operated lever device, the manually operated lever device has a swivel point which is fixed with respect to the screw actuator, the flexible cable drive is connected to the lever device at the swivel point, and an electromagnetic immobilisation device is provided for resisting rotation of the lever device in the case of normal operation and availability of electric power, and for allowing rotation of the lever device in the case of electric power failure.

5. System according to claim 4, wherein the lever device carries the electronic operating means for operating the screw actuator electrically.

6. System according to claim 5, wherein the electronic operating means comprises a joystick.

7. System according to claim 6, wherein the joystick is at a distance from the swivel point.

8. System according to claim 6, wherein the joystick is directly mounted to the swivel point, and is at least one of rotatable and liftable and otherwise movable in at least one of an x, y, and z axis.

* * * * *